April 6, 1965 D. E. RUTTER 3,177,494

ELECTROMAGNETIC TRANSDUCER HEAD

Filed Dec. 28, 1960 3 Sheets-Sheet 1

INVENTOR
DONALD E. RUTTER

BY John S. Gasper

ATTORNEY

United States Patent Office
3,177,494
Patented Apr. 6, 1965

3,177,494
ELECTROMAGNETIC TRANSDUCER HEAD
Donald E. Rutter, Vestal, N.Y., assignor to International Business Machines Corporation, New York, N.Y., a corporation of New York
Filed Dec. 28, 1960, Ser. No. 78,894
4 Claims. (Cl. 346—74)

This invention relates to magnetic recording and in particular to a magnetic transducing head and the method of manufacturing the same.

While not necessarily limited thereto, the subject invention relates to a magnetic transducing head particularly useful in the magnetic printing process.

As is well known to persons skilled in the art, magnetic printing involves the formation of magnetic images on a magnetizable surface. The images which are representative of data to be recorded are rendered visible by the application of minute magnetic particles to the image-bearing surface where they are selectively retained in accordance with the image pattern. The particle image is then transferrable to a print medium such as paper where it may be fixed to form a permanent copy of the data.

In one version of magnetic printing, the magnetic image is formed as a mosaic of magnetic dots or the like on the magnetizable surface. One type of magnetic transducer head which has been found to be particularly suitable for producing magnetic images on a movable magnetizable surface is the multi-element or stylus magnetic return path recording head. Such a transducer head is described in the U.S. Patent 2,950,161 of W. S. Rueger. As shown in the Rueger patent, the transducer head comprises a plurality of uniplanar magnetic core elements or styli, each of which is peripherally wound with a conductor element, and each of which is located within an individual recess of a row of recesses in a magnetic block member. The block member which serves as a magnetic return path for flux generated by the conductor also serves to support the cores in fixed array. A characteristic of the above-mentioned magnetic transducer head resides in the fact that the magnetic dots formed by the cores are concentrically polarized and adjacent dots have identically polarized perimeters. A mosaic pattern of such dots may be formed by selectively energizing the core elements in timed relation with the advance of the magnetizable surface. A plurality of such transducers may be arranged in one or more rows transverse to the direction of motion of a magnetizable surface. A control system for effecting the energization of the core elements is shown in U.S. Patent No. 2,820,956.

The object of the present invention is to provide an improved multiple stylus recording magnetic transducing head.

It is also an object of the present invention to provide a novel method for producing a multiple stylus magnetic recording head.

It is a further object of the present invention to provide such a method which may be suitable for mechanized or automated adaptation.

It is a still further object to provide an improved magnetic transducer head having a modular construction.

It is a further object to provide an improved magnetic transducer head adapted for assembly in a multiple track unit.

The above and other objects are attained in accordance with the practice of the present invention by providing a multi-element magnetic head comprising a plurality of spaced apart coplanar cores of magnetic material, each core being peripherally surrounded by an energizing coil and a common base peripherally surrounding each of the cores and coil assemblies respectively, said base member being a moldable flux permeable material. By making the common base member of moldable flux permeable material a transducer head is provided which lends itself to improved methods of manufacture without substantially sacrificing magnetic efficiency.

A method of manufacture in accordance with the present invention involves providing a continuous magnetic core element formed to have a serpentine flux path having a plurality of parallel straight portions and interconnecting bridge portions and an energizing element assembled to each of the straight portions, encasing the assembly of the core element and conductor elements in a block member of moldable flux permeable material, and separating the straight portions into independently energizable magnetic core elements within the block member by severing the bridge portions of the encased continuous core element from the straight portions. In a preferred embodiment, the continuous core element is a straight piece of electric iron wire bent in a sinuous or serpentine form and the hardenable plastic flux permeable material is ferrite or the like. By making the base member of plastic flux permeable material, it will be appreciated that a more economical multi-element magnetic transducer head can be produced. In addition it will be appreciated that by forming individual styli after they have been encased in a flux permeable mold, the manufacturing technique is greatly simplified. In addition the process of the present invention is more readily adaptable to mass production techniques.

Further in accordance with the present invention, a modular assembly is provided in which a multi-element transducer head is mounted on a modular base member with a plurality of driver means for the individual elements. With a common base member for the transducer head as well as the drivers, an improved package results which is suitable for assembly with additional modules. Furthermore, by making the module base member of magnetic material, more efficient magnetic structure is provided for the drivers as well as the transducer head. In accordance with a specific feature of the present invention, the drivers are transformer devices comprising core elements in the form of spools on which the primary and secondary winding are placed. The core elements are placed in recesses in the module base member. Channels in base member connecting the transformer recesses provide passageways for connection of the transformer windings to the transducer core elements. Additional magnetic as well as structural advantages are realized by tapering the transformer cores and the recesses in which they are placed. Thus, an improved compact assembly has been provided which is particularly suitable for multiple track magnetic recording and particularly for multiple line magnetic printing.

The foregoing and other objects, features and advantages of the invention will be further apparent from the following more particular description of preferred embodiments of the invention, as illustrated in the accompanying drawings.

Figures 5A, 5B, 5C, 6, 7:
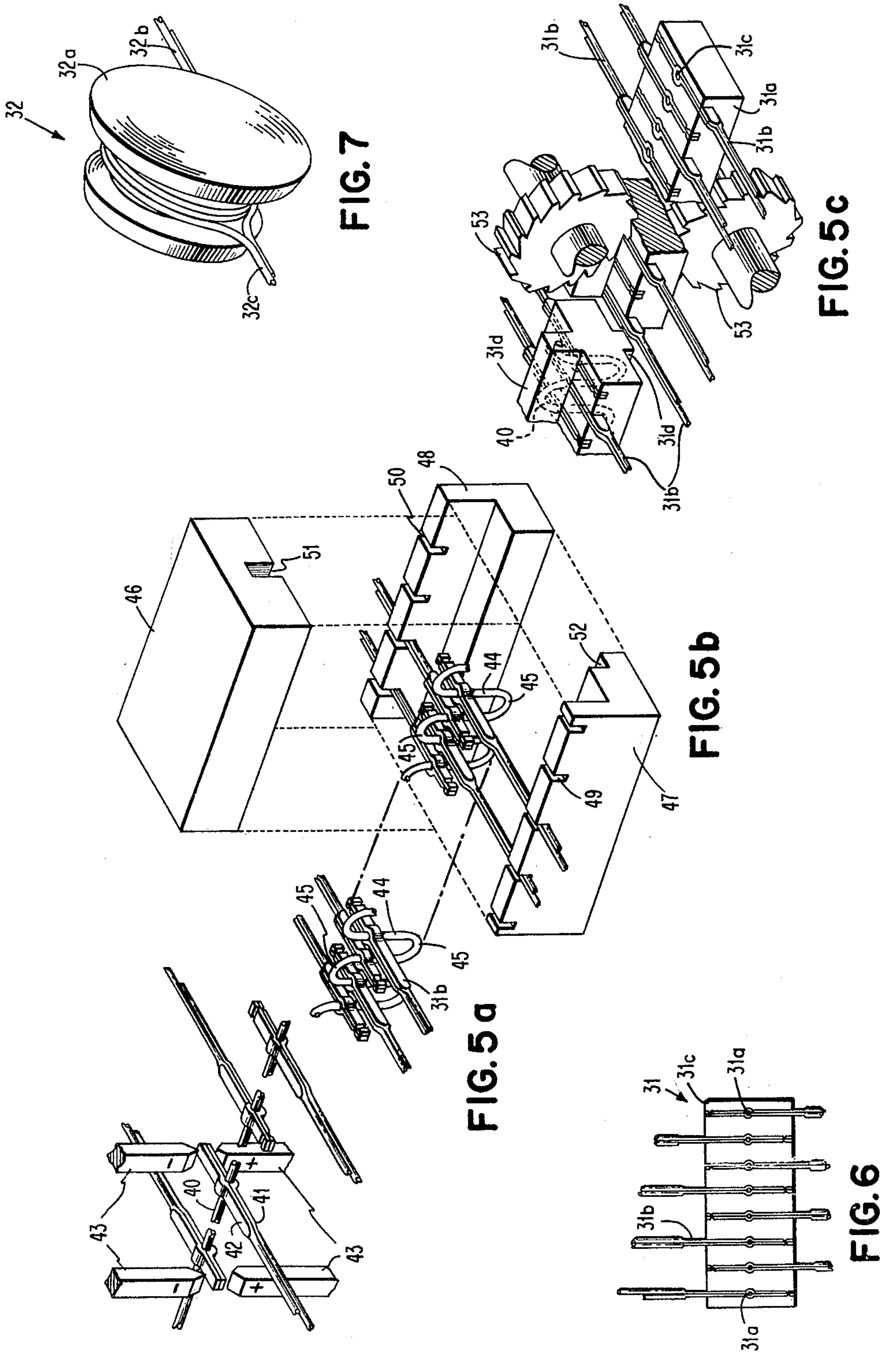

FIGS. 5*a–c* are a sequence of exploded isometric views designed to illustrate the steps in the method of manufacture of a transducer head in accordance with the present invention.

FIG. 6 is a bottom view of a transducer head made in accordance with method of FIGS. 5*a–c*.

Figures 3, 4:
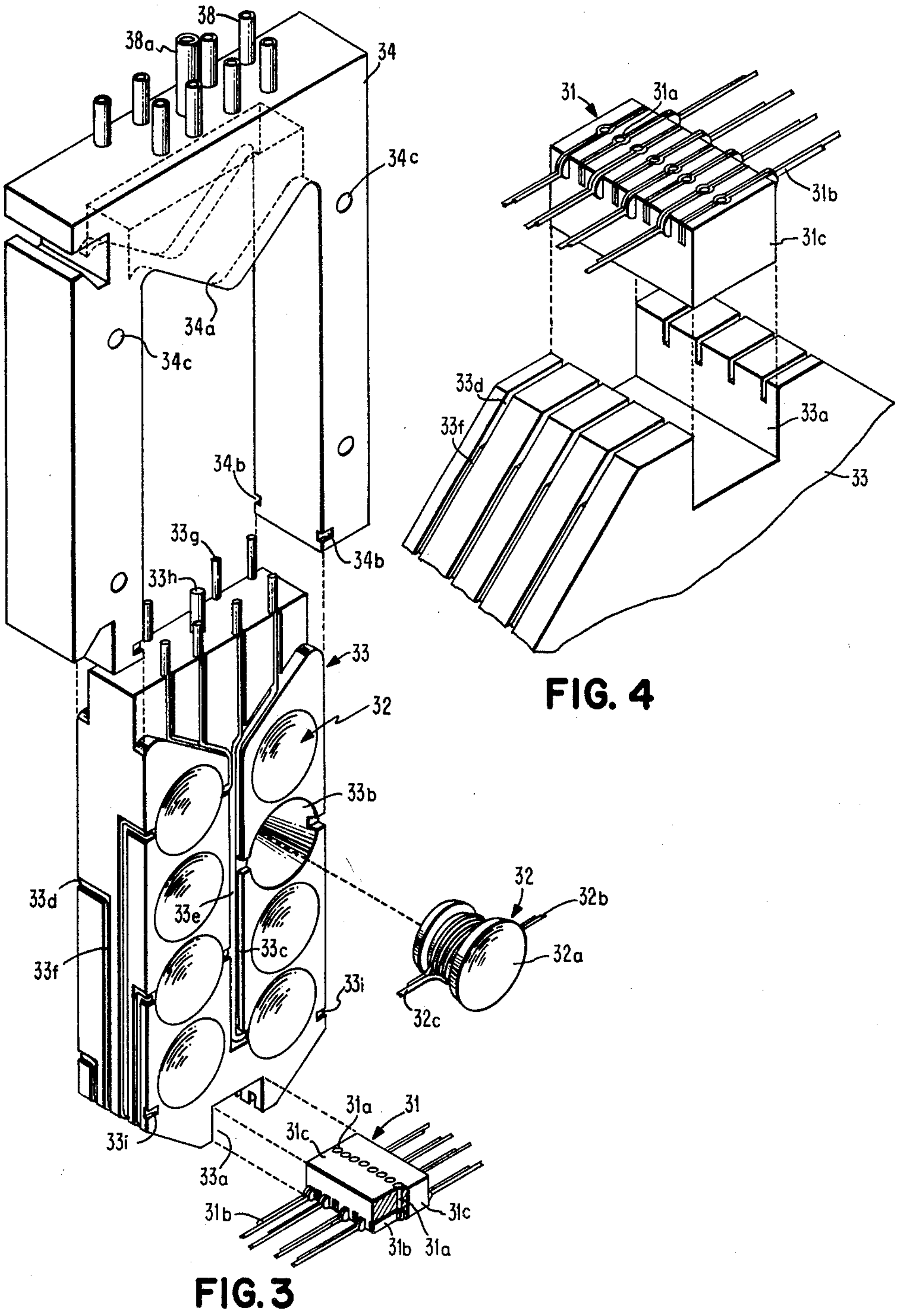
FIG. 3 is an exploded isometric view of the modular assembly of the present invention taken from FIG. 2.
FIG. 4 is an exploded isometric view of a detail of the assembly of FIG. 3.

FIG. 7 is an enlarged isometric view of a transformer element for use in a modular assembly of FIG. 3.

Figure 1:
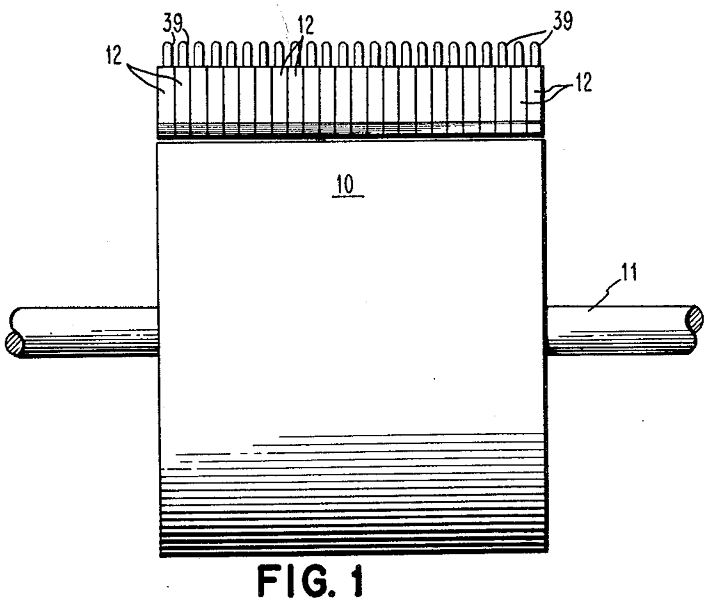
FIG. 1 is a front elevation view of a magnetic recorder of the type used in magnetic printing.

Referring to the drawings and particularly FIG. 1, a magnetic recording device is shown comprising a magnetic drum 10 mounted on suitable means including shaft 11 for rotation vis-a-vis a plurality of stationary magnetic recording devices 12 arranged in a row parallel to the axis of rotation. Each of the recording devices 12 is mounted proximate the surface of drum 10 so that magnetic bits, preferably in the form of dots of concentric polarity, are formed on the surface thereof as the drum is rotated about shaft 11.

The manner of mounting the recording devices 12 may take any suitable form but is preferably made so that each or a group of recording devices 12 is adjustable relative to the surface of drum 10 so that a measure of uniformity is obtainable in setting the gap between the recording devices and the drum surface. One arrangement for mounting the recording devices may be seen in FIG. 2. A stationary frame member 13 is fabricated to have a protruding support arm 14 to which the recording devices are adjustably mounted. For that purpose support arm is provided with a threaded opening 15 adapted to receive lower threaded portion 17 of a differential gap adjustment screw 16. Gap 9 is provided in support arm 14 to bind the threads of screw 16 in order to remove backlash. An upper threaded portion 18 of screw 16 is adapted to be turned in a threaded opening 22 in the upper arm 21 of a U-shaped movable mounting member 20. The shank 19 of the screw 16 is made long enough so that it will pass through opening 24 in lower arm 23 of movable mounting member 20 and an aligned opening 25 in arm 26 of support frame 13. The adjustment on a differential basis occurs when screw 16 is turned causing the mounting member 20 to move vertically. Axial adjustment of the mounting member 20, and hence the recording device 12 is effected by turning axial adjustment bolts 27 in frame member 13 which press a pair of flat pressure plates 28 against the protruding ends of arms 21 and 23 of mounting member 20. Lock nuts 29 and 30 may be provided for locking bolts 27 and adjustment screw 16 respectively.

Figure 2:
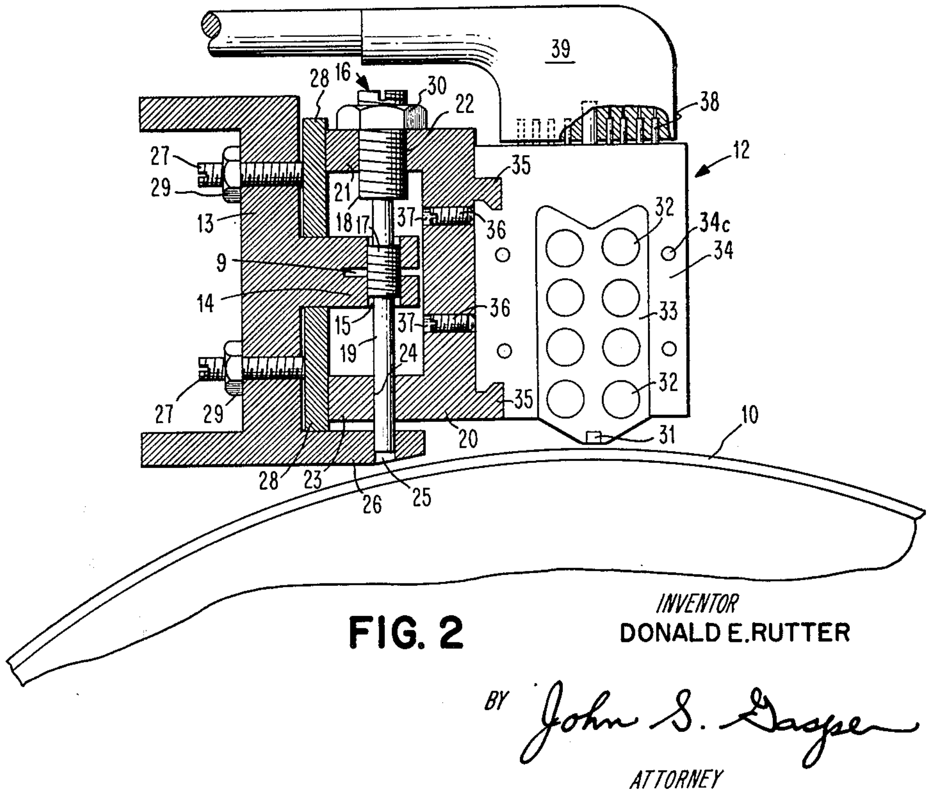
FIG. 2 is a side elevation of a portion of FIG. 1 with parts of the assembly of FIG. 1 shown in cross section.

In accordance with the practice of this invention, each recording device 12 is modular in construction. As seen in FIG. 2, a magnetic recording device module comprises a transducer head 31 a plurality of transformer energizing elements 32 a magnetic support block 33 therefor, and a non-magnetic mounting block 34. Details of the modular construction will be more fully described hereinafter. The attachment of the modular recording device to the mounting member 20 is accomplished by providing mounting member 20 with a pair of support hooks 35 adapted to be received within corresponding recesses in module mounting block 34. Locking bolts 36 in threaded openings 37 in mounting member 20 may be provided to press mounting block 34 against hooks 35.

The transducer head 31 of the modular assembly of FIG. 2 is shown in more detail in FIGS. 3, 4, and 6. Transducer head 31 may be characterized as a multiple stylus magnetic return path head and is particularly adapted for producing a mosaic pattern of concentric polarity magnetic dots on the surface of drum 10 when in motion. In accordance with this invention, a preferred embodiment of transducer head 31 comprises a plurality of uniformly spaced coplanar magnetic core elements **31*a* peripherally surrounded by a single turn flat copper conductor 31*b* and encased in a mold 31*c* of hardened plastic flux permeable material. As an illustration a transducer head has been chosen having eight magnetic core elements each of which is individually wound with a single turn copper conductor. With that number of cores, a matrix of magnetic data may be produced which is eight dots wide and any number long depending on the matrix pattern desired. Of course other matrix patterns may be desired such as 7 x 5 in which case transducer head 31 would have seven core elements 31*a*. For purposes of clarity the core elements 31*a*** are shown widely separated; however, the spacing is much closer than illustrated. As an example, a multiple stylus core for a 7 x 5 matrix pattern could include 7 core elements of .005 inch spaced apart on .015 inch centers for producing characters .090 x .060 inches. Using the same standards, an 8 x 6 matrix would produce characters .105 x .075 inches.

To produce a magnetic matrix pattern of data the core elements are selectively energized by passing short duration electric current pulses through conductors **31*b***.

In the preferred embodiment, each magnetic core element **31*a* is energizable by an individually operable transformer device 32. A transformer device particularly suitable for modular construction is shown in FIGS. 3 and 7. As there illustrated, transformer 32 comprises a spool-like core member 32*a* around the center of which are wound primary and secondary windings 32*c* and 32*b*** respectively.

The transducer head 31 and the plurality of transformer devices 32 are mounted on a single modular base member 33. For that purpose the base member 33 is formed as a rectangular flat block having a head recess **33*a* at the bottom edge, and transformer recesses 33*b* arranged in rows and having openings in opposite faces thereof. Grooves 33*c* and 33*d* are formed respectively in the face and side edges of block member 33 to provide suitable channels for electric conductors 33*e* and 33*f* respectively lead from the primary and secondary windings 32*c* and 32*b* of transformer 32 to terminals 38 and magnetic cores 31*a* respectively. In the preferred embodiment, the modular block member 33 is formed of flux permeable material such as ferrite having a linear magnetic characteristic. The transformer core 32*a* is preferably made of the same material. Thus magnetic efficiency is improved. Additional magnetic advantage is obtainable by making the core 32*a* and its corresponding recesses 33*b* tapered. Thus a tighter fitting of the magnetic elements is obtainable. In addition tapering of core 32*a* and recess 33*b* makes assembly of transformers 32 to modular block 33** greatly simplified.

The modular mounting block 34 is a U-shaped piece of non-magnetic material such as Bakelite or urea formaldehyde of the type having the trade name of melamine. The cross portion of the block 34 is provided with a recess **34*a* for receiving the upper end of modular block member 33. A plurality of hollow connector terminals 38 which may be molded into the block 34 at the time it is formed are positioned to receive corresponding electric terminals 33*g* of block 33**.

The method of making the transducer head 31 may be seen in greater detail by reference to FIGS. 5*a*, 5*b*, and 5*c*. As there shown, a continuous straight piece of electrical iron wire 40 for making the core elements **31*a* is selected. Conductor elements 41 are attached at spaced locations along the length of wire 40. The conductor elements 41 may take various forms and the attachment to wire 40 may also be performed in any suitable manner. In the preferred form two pieces 41 and 42 of flattened copper conductor are placed on opposite sides of the iron wire 40 and pressure applied thereto to shape them to the iron wire so as to obtain peripheral contact therewith. Subsequently the ends of the two pieces of copper conductor are butt welded preferably by electrodes 43 to make a single conductor 31*b***.

The copper conductors 41 and 42 may be pre-flattened ribbon or they may be cylindrical wire which is flattened near the ends just prior to pressing onto the iron wire 40. While the drawing suggests that the pressing of the copper conductors 41 and 42 occurs before butt welding, the two operations may be performed simultaneously in any suitable manner.

Following the attachment of the copper wires 41 and 42 to the iron wire 40 at a plurality of spaced points (e.g., eight for eight core elements) the continuous core 40 is then bent to a sinuous form. In the preferred method the serpentine or sinuous form is adapted by alternate bending of the iron wire 40 about a suitable tool (not shown) to provide a plurality of straight portions 44 interconnected at opposite ends by curved portions 45.

Subsequently the serpentine core element 40 is placed in a mold device and encased in a block of moldable flux permeable material.

A suitable mold device is shown in FIG. 5b in which blocks 46, 47, and 48 are assembled to provide a mold chamber into which flux permeable material can be poured. Prior to and during pouring the continuous core element 40 and conductors 31b are supported in a position which will assure substantial parallelism of the straight portions 44 of the core element with distribution of conductors to afford ease in assemblying the same to the energizing transformers. One manner in which this may be accomplished is to provide aligning grooves 49 and 50 in blocks 7 and 8 respectively into which the flattened portions of conductors 31b are inserted. Thus by flattening the conductors to an extent greater than needed to afford good magnetic association with iron wire 40, the conductor may be employed to serve as a positioning element for the core to effect alignment. Grooves 51 and step 52 in mold blocks 46 and 47 serve to provide a reduced volume chamber for the curved portions 45 of the core element 40.

After the serpentine core element 40 and conductors 31b are placed in position in blocks 46, 47, and 48 the flux permeable mold is formed. A suitable material is a mixture of epoxy resin such as Hysol 6020, an epoxy resin hardener such as Hysol J and carbonyl iron SF particles in a proportion of at least 50–75% iron particles by volume. Other materials or mixtures will readily occur to persons skilled in the art. A preferred material would generally include a high percentage of magnetic particles to afford a magnetically efficient return path to the core elements 31a.

Following the pouring operation, the mold is allowed to harden. At this point in the process the molded assembly is subjected to a machining operation which severs the curved portions 45 of core 40 from the straight portions 44. Various techniques may be utilized to accomplish this; the preferred form is to grind the raised sections 31d of block 31c. If desired the raised sections on opposite sides of the block 31d may be ground simultaneously by grinding tools 44. Grinding operation is preferred in that the change of getting fragments of conductor and or core intermixed in the mold so as to uncontrollably alter the magnetic homogeneity thereof is considerably reduced. However, a cutting operation may also be employed.

While the method of the present invention shows attaching conductors to a cylindrical core of iron wire and then shaping it in a sinuous form, the same sinuous flux path core may be provided in other ways and the attachment of conductors done subsequently.

In the embodiment illustrated the copper conductor 31b forms a magnetic recording gap between cores 31a and block member 31c. In the preferred construction the conductor element 31b should be exposed when the grinding operation has been completed. This may be accurately obtained in accordance with the practice of the present process by virtue of using the conductors as positioning elements in the pouring operation. The mold device may be machined so that when fitted together one of the raised portions define precisely the position of the conductor in the mold. Thus the grinding operation may be conducted precisely to machine to that point. Furthermore, the operations are conveniently performed automatically if desired without sacrificing precision.

By separate operations, the transformers 32 may be formed and wound with the appropriate number of turns of primary and secondary windings 32c and 32b respectively, the modular block 33 and mounting block 34 prepared. The modular block 33 if made of ferrite is preferably molded to the general shape shown including the formation of transformer recesses 33b. The grooves 33c and 33d are preferably cut after the molding operation. A sonic grinder is particularly suitable for this operation. Similarly transformer core 32a if ferrite is molded into a spool configuration. Winding of the spool core 32a is performed in any suitable manner well known in that art. In the preferred technique, the conductor elements 31b for transducer head core 31a are part of the conductor which forms the secondary winding 32b of transformer 32. Following the winding of transformer spool 32a with the primary winding 32c, the conductor 31b (and 32b) is looped and wound on spool 32a with appropriate insulation being provided to separate windings 32b and 32c. This operation is repeated for each transformer 32 for every core 31a of transducer head 31. The assembly of head 31 and transformers 32 to block 33 is then made. Each transformer 32 being placed in an appropriate recess 33b, primary conductors 32c are placed in grooves 33 with secondary leads 32b being placed in grooves 33d. Conductors 33c may be connected to terminals 33g and 33h at this time.

In a separate operation the modular mounting block 34 is fabricated by a suitable operation such as molding where the material is a plastic formaldehyde. The recess 34a may be formed at the same time and terminals 38 and 38a are placed in at the time of molding.

Following the separate preparation of each of the module elements, they are assembled to form a modular assembly. The assembly comprising block 34 with transformers 32 and transducer head 31 is inserted into the opening of block 34 with the upper end extending into recess 34a. The terminals 33g and 33h will then be inserted into terminals 38 and 38a, where they may be soldered if desired. Following this insertion block 33 is fixed to block 34 by placing hardenable epoxy resin in grooves 33i and 34b in blocks 33 and 34 respectively.

The modular assembly just described may be one of several like assemblies assembled in a larger or major modular group. For example, if it is desired to record 6 lines of magnetic characters, six of the modular assemblies may be assembled by sliding them on a mounting block 20 made wide enough for this purpose. After the modules are thus assembled, the hooks 35 may be upset to lock the modular assemblies firmly in the block 20. In addition, holes 34c in block 34 may be provided for rivets which are effective to hold a group of modular assemblies compact.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic recording module assembly adapted for group assembly with like module assemblies to form a multiple track magnetic image producing device comprising in combination a magnetic transducer device comprising a plurality of spaced apart coplanar core elements of magnetic material, energizing coils individually peripherally surrounding each of said cores, and a common base member of flux permeable material, said base member being in peripheral contact with each of said core and coil combinations; a plurality of electromagnetic transducer core driver elements, one for each said transducer core element including conductor means electrically common with individual ones of said energizing coils of said transducer core elements; a module base member of magnetic material forming a common support in a predetermined spaced array and flux path for each of said driver elements and said transducer device, and a module support member of non-magnetic material attachable to a frame member with other module assemblies adapted to support the assembly of said transducer device said plurality of driver elements and said module base member.

2. A magnetic recording module adapted for assembly with like modules to form a multiple track magnetic image producing device comprising in combination a magnetic transducer device comprising a plurality of spaced apart coplanar core elements of magnetic material, energizing coils individually peripherally surrounding each of said cores, and a common base member of flux permeable material, said base member being in peripheral contact with each of said core and coil combinations; a plurality of transformer elements comprising a core member of magnetic material, primary and secondary winding means for each of said core members, said secondary winding means being electrically common with individual ones of said energizing coils of said core elements of said transducer device; and a module base member of magnetic material forming a common support and flux path for each of said transformer elements and said transducer device.

3. A magnetic recording module in accordance with claim 2 in which said module base member is a module block member having recesses for receiving said transformer elements and said transducer device in predetermined array with channels connecting each recess of said transformer with the recess of said transducer device for receiving conductor means electrically common with said secondary windings and a corresponding energizing coil.

4. A magnetic recording module in accordance with claim 3 in which said transformer cores are tapered core members and said recesses in said module base member are tapered to provide an improved magnetic engagement between said cores and said base member.

References Cited by the Examiner

UNITED STATES PATENTS

| | | | |
|---|---|---|---|
| 2,835,743 | 5/58 | Muffley | 179—100.2 |
| 2,941,045 | 6/60 | Connell | 179—100.2 |
| 2,947,592 | 8/60 | Naiman et al. | 346—74 |
| 2,950,161 | 8/60 | Rueger | 346—74 |
| 2,966,726 | 1/61 | Gallentine et al. | 29—155.5 |
| 3,000,078 | 9/61 | Emenaker et al. | 29—155.5 |
| 3,008,793 | 11/61 | Shifrin | 346—74 |
| 3,042,999 | 7/62 | Page et al. | 179—100.2 |

IRVING L. SRAGOW, *Primary Examiner.*

NEWTON N. LOVEWELL, *Examiner.*